United States Patent
Gruber

[15] 3,678,456
[45] July 18, 1972

[54] VEHICLE MOUNTED WARNING DEVICE

[72] Inventor: Eugene Gerald Gruber, 70 Paisley Boulevard, Mississauga, Ontario, Canada

[22] Filed: Dec. 7, 1970

[21] Appl. No.: 95,811

[52] U.S. Cl. ..............................340/87, 40/129 C, 116/28, 340/119
[51] Int. Cl. .......................................B60q 1/00
[58] Field of Search..................116/28, 63, 132, 132 A, 173, 116/174, 175, 114; 40/129 C; 340/84, 87, 89, 90, 119, 122, 136, 144; 240/7.1

[56] References Cited

UNITED STATES PATENTS

| | | | |
|---|---|---|---|
| 2,538,885 | 1/1951 | Schumann, Jr. | 116/28 UX |
| 2,637,293 | 5/1953 | Graham et al. | 116/28 |
| 2,654,338 | 10/1953 | Deal | 116/114 |
| 2,738,492 | 3/1956 | Arneson et al. | 340/87 |
| 2,843,836 | 7/1958 | McDonald, Jr. | 340/87 |
| 2,924,811 | 2/1960 | Popkess et al. | 340/136 |
| 3,117,549 | 1/1964 | Ripepe | 116/28 |
| 3,128,448 | 4/1964 | Shumer et al. | 340/87 |
| 3,143,722 | 8/1964 | Murch | 340/84 |
| 3,439,326 | 4/1969 | Boudin | 340/87 |

Primary Examiner—Louis J. Capozi
Attorney—Leon Arthurs

[57] ABSTRACT

Means for supporting a visual warning signal for movement on a vehicle between a retracted, concealed position and an extended display position; a latch releasably holding said signal in the concealed position and a spring biasing it to display position when released by the latch; the movement of the signal to display position being controlled by limiting and speed checking devices.

2 Claims, 5 Drawing Figures

Patented July 18, 1972
3,678,456
2 Sheets-Sheet 1
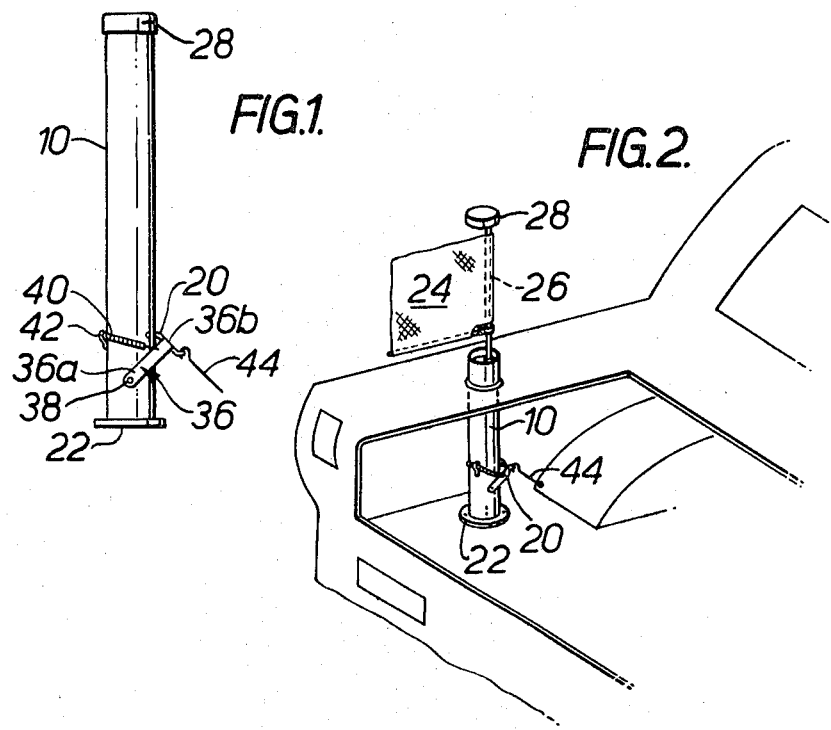
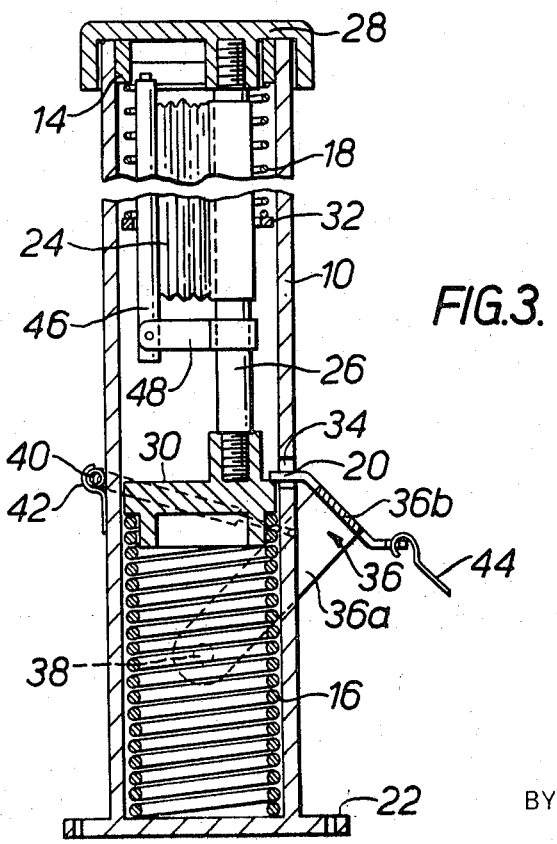
INVENTOR
E. G. GRUBER
BY
Leon Arthurs
ATTORNEY Patented July 18, 1972

INVENTOR
E.G. GRUBER
BY Leon Arthurs
ATTORNEY

VEHICLE MOUNTED WARNING DEVICE

This invention relates to a warning device for mounting on a vehicle for providing a visible notification of distress to other people.

Various types of warning device for mounting on vehicles are known in the prior art and in particular such devices for mounting on road vehicles are known wherein a telescopic device is mounted in a prominent position on the exterior of the vehicle for actuation by remote control from, for example, the driver's position in the interior of the vehicle. Amongst such telescopic devices have been disclosed the use of compression springs to effect the telescopic movement of the device from an inoperative position, in which no warning is visible, to an operative position in which a warning is visibly displayed.

It is a broad object of the patent invention to provide a warning device having at least two elements movable relative to one another wherein one such element is fixedly securable to the vehicle and the other element is movable between a retracted inoperative position and an extended display position and wherein such relative movement is damped for providing a smooth extending action free from sudden jolts or stops.

In accordance with the invention the subject warning device comprises a support for mounting on a vehicle and a visual warning signal movable relative to said support between a retracted position in which it is concealed from sight and a extended display position in which it provides a visible warning; a spring being provided for biasing said signal to its said extended position and a damper for slowing the rate of extension of said signal as the limit of its extension is approached, the device also including a latch normally restraining said signal in its retracted position against the bias of said spring and said latch being releasable for permitting extension of said signal as aforesaid.

Other objects of the invention more or less broad than the foregoing will become apparent from the hereinafter following description of the parts, principles and elements thereof given herein solely by way of example with reference to the accompanying drawings wherein like reference numerals refer to like parts throughout the several views and wherein:

FIG. 1 is a side elevational view of the subject warning device in its inoperative position;

FIG. 2 is a view of the device in its operative position with the warning signal proper displayed to view; the device being shown mounted on the rear fender of an automobile;

FIG. 3 is a cross-sectional view of the device in its inoperative position;

Figure 4:
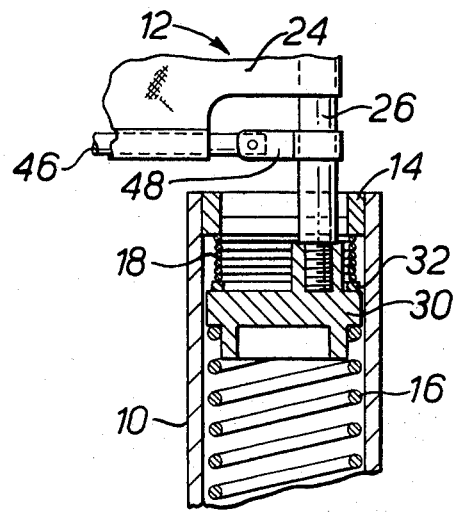
FIG. 4 is a cross-sectional view of the device in its operative position with the signal extended particularly showing the operation of the damper and FIG. 5 is a cross-sectional view of a modified form of the invention showing the warning signal proper at an intermediate position.

Referring first of all to the embodiment of the device shown in FIGS. 1 to 4 of the drawings, it will be seen that the warning device is comprised of a support in the form of an elongated tubular housing 10 and a warning signal proper 12 telescopically contained in said housing for movement relative thereto between the retracted position of FIG. 1, in which the signal is concealed from sight, and the extended position of FIG. 2 in which the signal 12 is visibly displayed. The housing 10 is fixedly securable at a suitable location on the vehicle in a prominent position thereon whereby the warning signal proper 12 may be readily observed when it is in its extended display position thereby serving as a visible notification of distress to other people.

The warning device also includes a stop 14 for limiting the extending movement of the signal 12 relative to its housing 10; a spring 16 for biasing the signal 12 to its said extended position; a damper 18 for slowing the rate of extension of said signal 12 as the limit of its extension is approached and a latch 20 normally restraining said signal 12 in its retracted position against the bias of said spring 16 and being releasable for permitting extension of said signal 12 as aforesaid.

Referring now to FIG. 3 of the drawings, it will be seen that the aforesaid housing 10 herein is of circular transverse cross-sectional form, and provided at its lower end with an annular flange 22 by means of which it may be secured to a vehicle in a prominent position thereon as aforesaid, such as on the rear fender of an automobile as shown in FIG. 2. In the said FIG. 3 embodiment, the warning signal proper 12 is in the form of a readily visible flag 24 preferably of a brightly colored material such as for example one which is impregnated with red or orange fluorescent figments and is movable relative to the housing 10 between the fully retracted position shown in FIG. 3 and an extended display position as shown in FIG. 4.

In order to mount the warning signal 12 for telescopic sliding movement relative to the housing 10, the flag 24 is mounted upon a mast 26 having a closure cap 28 secured thereto at its upper end and being fixedly secured at its lower end upon a plunger 30 which is a snug sliding fit within the interior of the housing 10. As will be seen from FIGS. 3 and 4 of the drawings the aforesaid spring 16, in the form of a coil compression spring, acts between the lower closed end of the housing 10 and the underside of the plunger 30 to bias the signal 12 outwardly of the upper open end of the housing whilst the damper 18, in the form of a further coil compression spring, is located between the upper surface of the said plunger 30 and the limit stop 14 at the upper open end of the housing.

Said stop 14 is in the form of an annular shoulder fixedly secured within the interior of the housing 10 and has an internal diameter which is less than the external diameter of the plunger 30 whereby the extending movement of the signal 12 out of the housing 10 is limited. The said damper coil spring 18 is secured by its upper end convolutions to the underneath of the annular shoulder 14 and depends therefrom within the housing 10. The lowermost convolutions of the damper spring 18 are conveniently secured to an annular ring 32 impingeable by the upper surface of plunger 30 as the said plunger approaches the limit stop 14. Thus said signal 12 is extended under the influence of the main coil spring 16 acting on the under surface of the plunger 30 and the rate of extension is slowed by the damper coil spring 18 as the upper surface of the plunger 30 contacts said ring 32 as the limit stop 14 is approached at the extremity of the extending movement of the signal.

Such slowing down of the extending movement of the signal provides a smooth extension free from any jolts or sudden stops whereby the various parts of the assembly are less prone to damage and wear during use.

Thus in the extended position shown in FIG. 4 the plunger 30 is "floating" between the main coil spring 16 and the damper coil spring 18. It will of course be appreciated that the main coil spring 16 is considerably stronger than the damper spring 18 whereby, in the extended position of FIG. 4, the damper spring 18 is under considerable compression whilst the main coil spring 16 is still under some slight degree of compression but has almost reached its unstressed condition. Conversely, in the retracted position of the signal as shown in FIG. 3, the main coil spring 16 is under considerable compression whilst the damper spring 18 is unstressed.

As previously mentioned, the warning signal 12 is retained in its said retracted position by a latch 20 which in the embodiment shown herein co-acts directly with the plunger 30 carrying the signal thereon. More specifically the latch 20 is in the form of a tongue insertable and withdrawable through a corresponding aperture 34 in the side of the housing 10 to engage with the upper surface of the plunger 30 to restrain the warning signal 12 in its retracted position against the bias of the main coil spring 16. As will be clearly seen from FIGS. 1 to 3, the tongue 20 is fixedly mounted on a stirrup 36 passing partially around the exterior of the housing 10; said stirrup 36 being comprised of a pair of limbs 36a interconnected by a yoke 36b; the extremities of said limbs 36a being pivotally mounted on said housing at diametrically opposed locations 38 whilst the tongue 20 is carried by said yoke 37b. Said stirrup 36 is biased towards the housing 10 to bring the tongue 20 into its plunger engaging position by means of a coil tension spring 40 also embracing the housing and having its ends parted to the respective limbs 36a as shown and retained in position by a clip 42 on the exterior of the housing.

The latch 20 is conveniently actuated by means of a cable, one end of which is illustrated diagrammatically at 44 in FIGS. 1 to 3, the other end of which may be connected to a suitable control at a position remote from the location at which the warning device is mounted, as for example in the interior of the vehicle adjacent the driver's position. As shown in FIG. 2 said cable 44 enters the interior of the vehicle adjacent the position at which the device is mounted.

Thus, the application of tension to the cable 44, when the signal 12 is in its retracted position as shown in FIG. 3, will pivot the stirrup 36 downwardly withdrawing the tongue 20 from engagement with the upper surface of the plunger 30 and permitting extension of the signal under the influence of the main coil spring 16, which extension will be damped as aforesaid as the limit stop 14 is approached by the plunger 30 and the damper 18 is engaged. It will further be noted that, in the embodiments shown in FIGS. 2, 3 and 4, the warning flag 24 is provided with a weight bar 46, pivotally mounted at that end thereof adjacent the mast 26 upon a bracket 48 secured to the mast, so that, upon emergence of the signal from the housing, the weight bar 46 will fall under gravity to release the flag 24 from its folded position as shown in FIG. 3 to the fully displayed position as shown in FIGS. 2 and 4.

It should furthermore be noted that the end closure cap 28 secured to the top of the mast 26 is proportioned to fit snugly over the exterior of the open end of the housing 10 when the signal 12 is in its retracted position forming a weatherproof closure and protecting the contents of the interior of the housing 10.

As illustrated herein, the tongue 20 which restrains the signal 12 in its retracted position is of square-ended form whereby it will not normally be possible to retract the signal 12 from the extended position of FIG. 4 to the retracted position of FIG. 3 by ratcheting the plunger 30 past the tongue 20. It will be apparent that the signal 12 may be moved back to its retracted position by downward pressure upon the end closure cap 28, against the influence of the main coil spring 16, until the plunger 30 is located below the aperture 34 in the housing at which time the tongue 20 may be re-engaged with the upper surface of the plunger 30. However, by squaring the end of the tongue 2, and prohibiting a ratcheting action of the plunger 30 past the tongue 20 when the plunger 30 is being moved downwardly within the housing, it will be necessary for the operator to withdraw the tongue 20 to the release position as shown in FIG. 2 before the plunger may be moved below the aperture to permit reengagement of the tongue 20 with the plunger 30. Such an arrangement prohibits movement of the signal 12 to its retracted position merely by means of pushing the signal downwardly into the housing since a positive step will be required to move the latch 20 to its release position prior to movement of the signal to its fully retracted position with subsequent re-insertion of the latch 20 to its plunger engaging position.

Figure 5:
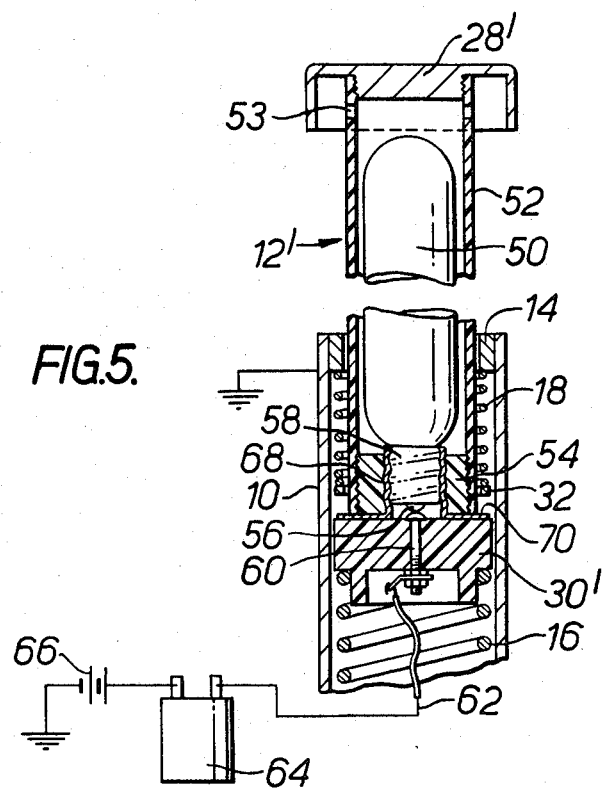

Turning now to the modification shown in FIG. 5 of the drawings, it may first of all be observed that the essential mechanical actuation and operation of the signal 12' shown therein between its retracted and extended positions is identical with that hereinbefore described with reference to the FIGS. 1 to 4 embodiment. As illustrated in FIG. 5 the warning signal proper 12' is in the form of an electric light bulb 50 conveniently protected within a casing 52 of a readily distinguishable color such as red or amber for example. As will be further explained herein in more detail, the various electrical connections to the light bulb 50 are arranged so that, in the retracted position of the signal, electrical contact is broken whilst contact is automatically completed to illuminate the lamp upon movement thereof to the extended display position.

Referring now to FIG. 5 in more detail, it will be observed that the main coil spring 16 and the arrangement and location of the stop 14 and damper spring 16 are identical with the preceding embodiment whereas the plunger 30' upon which the warning signal proper is mounted is modified to accommodate the appropriate electrical connections as hereinafter described. To this end the said plunger 30' is formed of an electrically insulating material having an externally threaded bushing 54 on its upper surface to which is screw threaded the aforesaid casing 52 for the lamp 50; the upper end of said casing 52 having an end closure cap 28' for the housing 10 secured thereto. As illustrated herein, the casing 52 is conveniently formed of a colored plastics material provided with appropriate vent holes 53 to dissipate the heat generated within the casing by the electric lamp.

In this embodiment the said lamp 50 is shown as having a single center pole 56 and a screw thread 58 mounting into an appropriate lamp socket secured to the upper surface of the plunger 30'. When the lamp 50 is screwed into its socket, the center pole 56 makes electrical connection with a contact 60 in the form of a rivet extending through the plunger 30' and connected by an electric cable 62 to a flasher unit 64 and an electrical energizer 66 which may conveniently be the battery of the vehicle to which the device is fitted. The screw thread 58 of the lamp makes electrical contact with a threaded shell 68 provided with a contact 70 on the upper surface of the plunger casing 30' and extending radially outwardly thereof beyond the lamp casing 52.

Although said contact 70 extends radially outwardly beyond the lamp casing 52, it does in fact terminate somewhat short of the periphery of the plunger 30' whereby said contact 70 is prevented from contacting the interior of the housing 10. Thus, in the position shown in FIG. 5, there is no completed electrical connection to the lamp 50 as the screw shell 68 accommodating the lamp is not grounded to complete the circuit, said contact 70 being isolated by the insulating material of the plunger 30' and the lamp casing 52. However, upward movement of the warning signal to its extended display position will, as previously described, cause the upper surface of the plunger 30' to impinge upon the damper spring 18 to slow the extending movement of the signal at which time the electrical circuit is completed as the projecting contact 70 contacts the ring 32 attached to the lowermost convolutions of the damper spring 18 thereby completing the circuit to ground. Although for the sake of clarity herein a separate ground connection is shown to the housing 10, it will be appreciated that normally such grounding will be established by the fastening of the housing 10 to the vehicle body by means of screws or bolts passing through the flange 22.

What I claim is:

1. A warning device for mounting on a vehicle including:
   an electric lamp constituting a visual warning signal;
   a support carrying said signal thereon, said signal being movable relative to said support between a retracted position in which it is concealed from sight and a display position in which it is extended from said support to provide a visible warning;
   a stop for limiting the extension of said signal from said support;
   a spring for biasing said signal towards its said display position;
   a damper for slowing the rate of extension of said signal as said limit stop is approached;
   a latch normally restraining said signal in its retracted position against the bias of said spring means, said latch being releasable for permitting extension of said signal as aforesaid;
   said support comprises an elongated tubular housing wholly containing said signal in its said retracted position and being open at one end thereof permitting telescopic extension of said signal out of said end;

said spring and damper also being contained within said housing and acting upon said telescopically movable signal as aforesaid;

a plunger is contained within said housing for snug sliding movement therein, said plunger providing a mounting upon which said signal is secured;

said spring acting between said plunger and a part of said housing to bias said signal out of said housing end and said damper being engageable by said plunger as said limit stop is approached;

a socket carried on said plunger and accommodating said lamp;

said socket having a first contact therein permanently connected to a grounded electrical energizer and a second contact engageable with said damper only in the display position;

said damper being grounded to provide a complete electrical circuit illuminating said signal when in the display position aforesaid.

2. A warning device as claimed in claim 1 wherein:

said plunger is formed of an electrically insulating material;

said second contact is carried on the upper surface of said plunger spaced from the interior of said housing;

said damper comprises a coil spring located between said open end of the housing and said plunger and, the lowermost convolutions of said damper spring are impingeable by said second contact to complete the electrical circuit as aforesaid.

* * * * *